United States Patent
Stevens

[15] 3,660,981
[45] May 9, 1972

[54] THE S/TOL AIRCRAFT
[72] Inventor: Emerson W. Stevens, Snyder, N.Y.
[73] Assignee: The United States of America as represented by the Secretary of the Air Force
[22] Filed: Oct. 5, 1970
[21] Appl. No.: 77,776

[52] U.S. Cl. ........................60/226 R, 60/229, 60/231, 137/81.5, 239/265.23, 244/53
[51] Int. Cl. .........................F02k 1/20, F02k 3/06
[58] Field of Search ............60/226 R, 229, 231; 137/81.5; 244/53; 239/265.23

[56] References Cited

UNITED STATES PATENTS

| | | | |
|---|---|---|---|
| 3,121,414 | 2/1964 | Peterson | 60/229 |
| 3,143,856 | 8/1964 | Hausmann | 60/231 |
| 3,266,243 | 8/1966 | Thomas | 60/229 |
| 3,474,966 | 10/1969 | Holmes | 244/52 |
| 3,482,804 | 12/1969 | Pyptiuk | 60/226 |
| 3,577,736 | 5/1971 | Stevens | 60/226 |
| 3,280,560 | 10/1966 | Marchant | 60/226 |

Primary Examiner—Douglas Hart
Attorney—Harry A. Herbert, Jr.

[57] ABSTRACT

The invention concerns a turbo fan engine and in which the output of the fan can be normally directed downwardly to lift the aircraft from the ground, or optionally, can be caused to shift into a horizontal direction and thus augment the normal thrust of the engine. It has particular application to the so-called "vertical short takeoff and landing" type of aircraft. The fan is located forward of the engine and the movement of the air which is in excess of that furnished to the compressor in changed as to direction from the vertical to the horizontal by causing a jet of high pressure air, obtained from a source exterior of the fan, bodily to shift or divert the air column emanating from the fan traveling in the downward vertical direction to now travel in the horizontal direction after the plane has attained its proper height in space. The diverting jet of high pressure air is discharged from an annular opening in a chamber of ring-like character which surrounds the engine and to which the source of high pressure air, preferably taken from the compressor, is applied.

5 Claims, 6 Drawing Figures

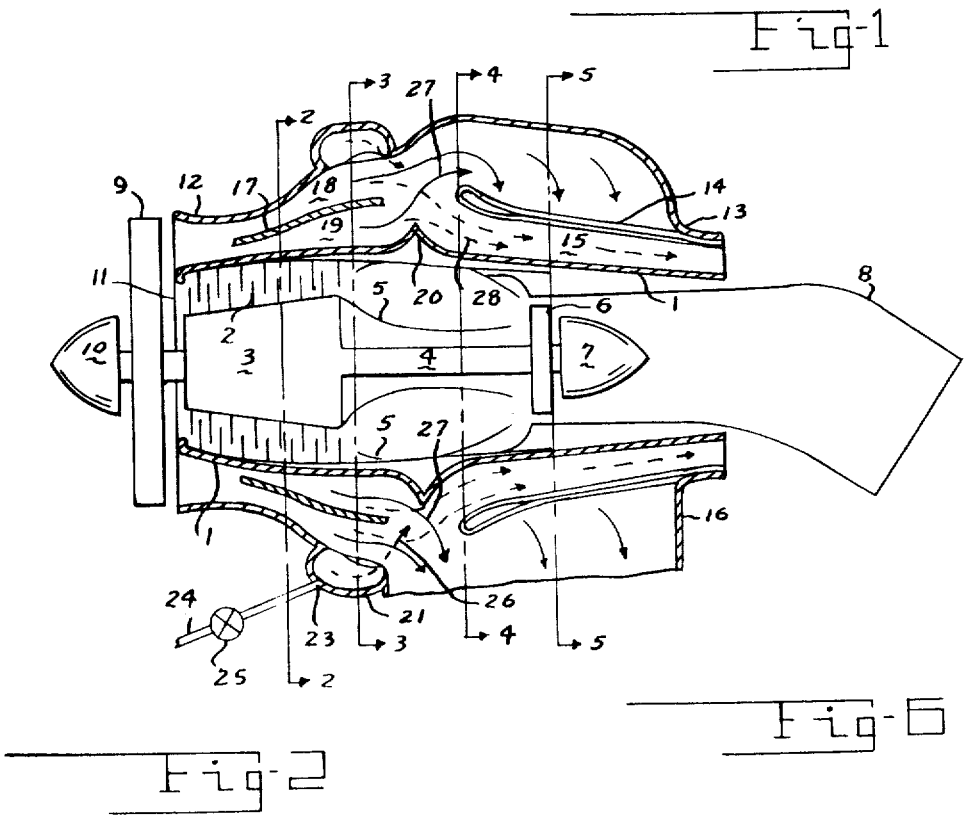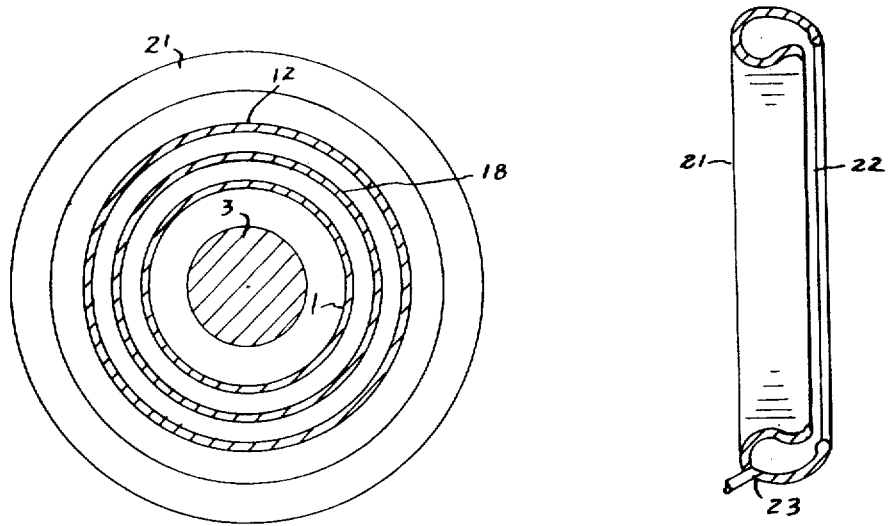

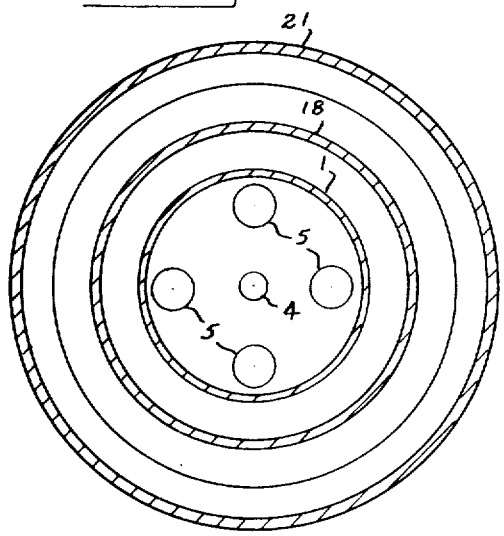
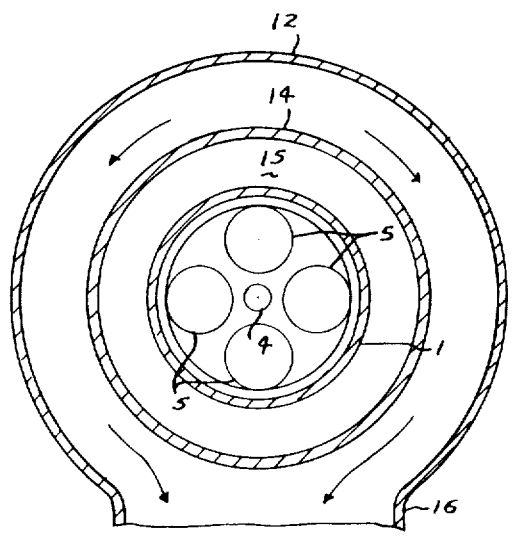
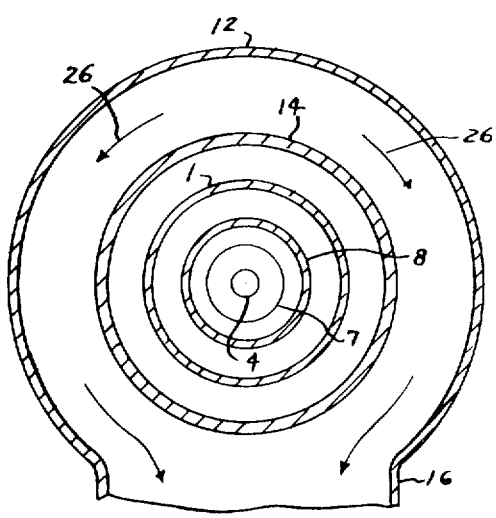

THE S/TOL AIRCRAFT

BACKGROUND OF THE INVENTION

It has always been a desire of the aircraft industry to increase the lifting power of the plane at the start so that shorter runways can be employed. Planes are placed in categories according to their ability to leave the ground in the shortest length of time and space. These categories are designated broadly: (1) the V/TOL meaning "vertical takeoff and landing" and (2) the V/STOL meaning vertical or short takeoff and landing. The category (1) in effect requires a plane to rise almost vertically from the runway while category (2) requires the plane to rise either vertically or in a composite direction at a sharp angle. The expense of long complex runways is almost prohibitive so that more and more emphasis is being placed on planes which can rise at a fast rate, at the option of the pilot, and from a miniature runway. Again, it has also been highly desirable in the case of a light plane to be able to fly practically vertically, similar to a helicopter, and upon reaching a predetermined height to be able to proceed in the horizontal direction. Still further proposals in the art have been to provide a vertical rotor shaft and blades, similar to a helicopter, and to motivate the vertical lift from the same engine that is used for horizontal flight. The mechanism by which the changeover functions have been accomplished, or attempted to be accomplished, consists of mechanical flap valves and gears which are overly complicated and are hard to operate. It has also been proposed in those planes having wing supported jet engines to turn the wings and attached engines 90° to obtain a vertical thrust when ground lift is desired. But, planes of this character are large and cumbersome, since the wings must be supported on bearings about which they are able to turn, and the effort of turning becomes considerable on account of the weight of the fuel carried within the wings as well as the weight of the wing supported engines.

SUMMARY OF THE INVENTION

An object of the invention is to provide an improved airplane of the V/STOL type and in which the takeoff and landing performance of the plane is enhanced.

Another object is to provide an airplane which can be converted from horizontal to vertical flight and vice versa, without the use of movable parts within or directly associated with the engine.

Another object is to provide an airplane which is suited to perform equally well on horizontal and vertical flights, when using the same original source of power for each form of flight, and without the use of additional driving jets, change over valves, or other expensive equipment.

Still another object is to provide an airplane of the turbo-fan jet type in which the air derived from the fan over and above that supplied to the compressor can be employed to give the plane greater lifting power at the start, and alternatively, to boost its rate of travel in the conventional direction at the option of the pilot.

Another object is to provide a V/STOL plane in which the switch-over from vertical lift to horizontal power is accomplished without the use of mechanical air directing valves or rotational movement of the airfoils and/or engine, and without the use of a vertical "air screw" effect.

Still another object is to provide the V/STOL plane in which the lifting power is obtained from the same engine as the horizontal power. These objects are attained in brief by directing the air given off by the forward fan, over and above that required by the compressor, from a lifting vertical effort upon starting to a horizontal power effort by means of a suitably positioned jet of air taken from a high pressure source and propagated in such a direction toward the column of air from the fan as to swing it from the vertical lift direction to the horizontal power direction.

Other objects and features will be apparent as the specification is perused in connection with the accompanying drawings, in which:

FIG. 1 is a vertical longitudinal section but with the relatively unimportant details in diagram, of the improved engine suitable for a V/STOL plane.

FIGS. 2, 3, 4, and 5 represent sectional views taken along lines 2—2, 3—3, 4—4, and 5—5, respectively, of FIG. 1 and looking in the direction of the arrows.

FIG. 6 is a fragmentary view and broken at both ends of the annular compartment employed to direct the excess air from the forward fan from the vertical to the horizontal direction, and vice versa.

Referring to FIG. 1, reference character 1 designates a cylindrical casing of elongate shape and made of steel of substantial thickness. This casing would normally be cast and is of rugged construction. It contains at one end a compressor 2 of standard and well known type of which the rotating vanes are carried on a solid member 3, and the stationary vanes are mounted within the casing. The member 3 is of cone-like shape and is carried on a heavy shaft 4, both axially disposed with respect to the compartment. There are several (four, as illustrated in FIGS. 3 and 4) combustion chambers 5 contained between the shaft 4 and the casing 1. These chambers are of cylindrical configuration with partially open ends, the chambers being disposed angularly with respect to one another as shown. The shaft 4 carries a turbine wheel 6 of well known type, and at the extreme end there is a solid knob 7, rounded to give a streamline effect. An exhaust or discharge pipe 8 is attached to the end of casing 1 for receiving and directing the gases combusted in the chambers 5, thereby to form a power jet.

The operation of the engine is well known, and it is sufficient to state that air is delivered to the compressor by the fan 9. Fuel and air from the compressor are delivered to chambers 5 in the conventional manner. Combustion is initiated by an igniter, not shown, in the conventional manner and with the products of combustion leaving the combustion chambers in the conventional manner. The gas on its way to the thrust outlet 8 passes through the turbine wheel 6, and causes it to rotate at high speed. The shaft 4 is rotated to actuate the compressor and fan 9. The gases of combustion travel to the thrust outlet 8 to form a jet which furnishes the driving power for the aircraft in the forward direction.

In the device of this invention, the air from the outer segment of fan 9 is employed for providing the vertical lift effect. Directly adjacent the outer peripheral border of the fan, there is a cylindrical casing 12 formed by casting, and having a diameter of about the same size as that of the fan which, together with the casing 1, constitutes an annulus for receiving the outer diametral segment of air delivery by the fan. The casing broadens outwardly with increasing diameter until section line 4—4 is reached, and then rapidly falls off in size until at a point 13 it joins with the relatively long cylindrical member 14. This member is supported from the casing 1 by spacers (not shown) to leave a passageway 15 therebetween. The outside casing does not form a complete cylinder but, as shown in FIGS. 4 and 5, the casting is provided with a large downwardly extending spout 16. The cylinder extends outwardly for a short distance beyond the junction point 13 and its diameter steadily increases toward the inner end, so as to bisect the space between the outer casing 12 and the inner casing 1. It will be noted in FIG. 1 that the casing 1 has an outwardly extending ridge 20, about half way along its length and the purpose of which will be explained hereinafter. At a position about midway of the length of the casing 12 and secured thereto in any suitable manner there is an annular compartment 21 which is perimetrically complete, but has a narrow slot 22 (FIG. 6) extending over the entire circular length of the compartment. The latter is also provided with one or more openings 23 (FIG. 6) from which extends a conduit 24 (FIG. 1) controlled by an open and shut valve 25 of any suitable and well known type. The conduit 24 is initially connected to a source of high pressure air, which may conveniently be the compressor 2, so that upon opening the valve 25 compartment 21 is supplied with air under tremendous pressure. The latter issues as a circular jet from the slot 22, and for the purposes set forth hereinafter. A diffuser 17 is positioned in the inlet between casings 1 and 12.

OPERATION

The purpose of the apparatus, shown and described hereinbefore, is to provide a turbojet engine of the forward fan type with structure by which the plane can rise vertically, or at least at a sharp angle, and therefore requires a relatively short runway. Assuming that the aircraft is standing on the ground or runway and about to take off in a sharp upward path, the engine is started by admitting fuel to the combustion chambers 5. The fuel, when combined with the air, normally passing through the compressor, is sufficient to form a combustible mixture upon being electrically ignited. The products of combustion strike the turbine 6 and cause the shaft 4 to rotate, and thus actuate the compressor and the forward fan 9. All of the fan air in chambers 18 and 19 is deflected by ridge 20 into the path shown by arrows 27. The spout 16 receives all of the air furnished by the outer portion of the fan to provide a maximum vertical thrust for the aircraft.

In forward flight a small degradation in the total energy is tolerable, thus for forward flight valve 25 is turned to admit air through line 24 to chamber 21 and out through exit nozzle 22, as shown by arrow 26, to direct the total fan air in chambers 18 and 19 along the path shown by arrows 28 to add to the total forward thrust of the aircraft. When about to land, the supply of fuel to the burners 5 is reduced to slow down the forward speed of the plane and the valve 25 is closed so that the air furnished by the outer portion of the fan to chambers 18 and 19 is again deflected by ridge 20 into the path shown by arrows 27 into the spout 16.

There is thus provided a turbojet engine for a V/STOL type aircraft wherein air from a by-pass fan is directed downwardly by engine geometry for V/STOL operation and is directed along a second path by air flow through an annular control duct to add to the forward thrust in forward flight.

I claim:

1. A jet engine for a V/STOL airplane, said engine including a "forward" fan and means for directing air from said fan to flow in the vertical direction for takeoff of the plane and in the horizontal direction for sustained flight of the plane, in which said means comprises a circular jet of high pressure air directed against the air delivered by said fan.

2. A jet engine for a V/STOL airplane, said engine including a "forward" fan and means for directing air from said fan to flow in the vertical direction for takeoff of the plane and in the horizontal direction for sustained flight of the plane, in which the engine includes a compressor, a combustion chamber, and a turbine and the means for directing the air of the fan from the vertical direction to the horizontal direction is constituted of high pressure air taken from the compressor of the engine.

3. A jet engine for a V/STOL airplane according to claim 2 in which the means for directing the air of the fan from the vertical to the horizontal direction is constituted of a compartment surrounding the engine and containing air under high pressure, a slot in said compartment from which the air content issues as a jet, said slot being so positioned as to cause said last-mentioned jet to direct air from the fan to move from the vertical to the horizontal direction.

4. A jet engine for a V/STOL airplane according to claim 3 and in which said compartment is connected through a valve to said compressor whereby the compartment is filled with high pressure air to form a jet for directing the air from said fan to move from the vertical to the horizontal direction.

5. A jet engine for a V/STOL airplane, said engine including a casing containing a compressor, a combustion chamber, a turbine and a jet exhaust pipe, a "forward" fan positioned ahead of the compressor, said fan being of larger diametral size than the compressor whereby the outer peripheral portion of the fan which extends beyond the compressor normally supplies air which passes over the casing, a housing surrounding said casing to receive the excess air from the peripheral portion of the fan, said housing surrounding all the internal elements within said casing, and said housing being provided with a downwardly extending spout and with a rearwardly extending air exit opening, and means for causing the air from the peripheral portion of the fan to pass into the housing and be expelled from the spout as a plane-lifting jet and means for changing the vertical direction of said air to a horizontal direction to join with the jet issuing from said exhaust pipe, in which said last mentioned means comprises a circular jet of high pressure air which impinges against the air passing through the spout and changes the direction of that air to the horizontal direction and joins the products of combustion flowing through said jet exhaust pipe to assist in the sustained flight of the plane.

* * * * *